(12) United States Patent
Hales et al.

(10) Patent No.: US 8,339,747 B1
(45) Date of Patent: Dec. 25, 2012

(54) REMOVABLE ACTUATOR ASSEMBLIES FOR TESTING HEAD GIMBAL ASSEMBLIES OF A STORAGE DEVICE

(75) Inventors: Geoffrey A. Hales, San Jose, CA (US); Chunjer C. Cheng, Saratoga, CA (US); Tao Lin, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 137 days.

(21) Appl. No.: 13/046,566

(22) Filed: Mar. 11, 2011

(51) Int. Cl.
*G11B 5/55* (2006.01)
*G11B 5/127* (2006.01)
*B23P 19/00* (2006.01)

(52) U.S. Cl. ............... 360/245.2; 29/603.03; 29/737

(58) Field of Classification Search .......... 360/245.2; 29/603.03, 737
See application file for complete search history.

(56) References Cited

U.S. PATENT DOCUMENTS

| | | | |
|---|---|---|---|
| 4,943,875 A | 7/1990 | Reidenbach et al. | |
| 4,947,275 A | 8/1990 | Hinlein | |
| 5,062,018 A | 10/1991 | Yaeger | |
| 5,296,984 A | 3/1994 | Fick | |
| 5,339,702 A | 8/1994 | Viches | |
| 5,491,413 A | 2/1996 | Guzik | |
| 5,495,375 A | 2/1996 | Baasch et al. | |
| 5,696,653 A | 12/1997 | Lacey | |
| 5,715,117 A | 2/1998 | Brooks | |
| 5,731,932 A | 3/1998 | Crane | |
| 5,771,139 A | 6/1998 | Lee et al. | |
| 5,781,380 A | 7/1998 | Berding et al. | |
| 5,786,677 A | 7/1998 | Marr | |
| 5,844,420 A | 12/1998 | Weber et al. | |
| 5,862,019 A | 1/1999 | Larson | |
| 5,946,164 A | 8/1999 | Tracy | |
| 6,038,755 A | 3/2000 | Mendel et al. | |
| 6,061,896 A | 5/2000 | Tracy | |
| 6,078,469 A | 6/2000 | Girard | |
| 6,140,661 A | 10/2000 | Nodelman | |
| 6,150,813 A | 11/2000 | Schadewald, Jr. et al. | |
| 6,157,521 A | 12/2000 | Utsunomiya | |
| 6,166,886 A | 12/2000 | Toensing | |
| 6,236,201 B1 | 5/2001 | Kilicci et al. | |
| 6,324,130 B1 | 11/2001 | Hatam-Tabrizi et al. | |
| 6,346,809 B1 | 2/2002 | Karam, II | |
| 6,392,844 B1 | 5/2002 | Summers | |
| 6,407,888 B1 | 6/2002 | Crane | |
| 6,417,993 B1 | 7/2002 | Kant et al. | |
| 6,459,260 B1 | 10/2002 | Bonin et al. | |
| 6,472,866 B2 | 10/2002 | Aslami | |
| 6,493,186 B1 | 12/2002 | Segar et al. | |
| 6,510,752 B1 | 1/2003 | Sacks et al. | |
| 6,531,867 B1 | 3/2003 | Greene et al. | |
| 6,571,454 B1 | 6/2003 | Haney et al. | |
| 6,708,389 B1 | 3/2004 | Carlson et al. | |

(Continued)

*Primary Examiner* — Allen Heinz

(57) ABSTRACT

Removable actuator assemblies for testing head gimbal assemblies of a storage device are provided. One such removable test assembly for a head gimbal assembly (HGA) includes an actuator base including at least one guide pin, a shoe assembly including a body including a first end portion opposite to a second end portion, a first attachment means for releaseably coupling the shoe assembly with the actuator base, the first attachment means positioned along the first end portion and including at least one hole in the body configured to receive the at least one guide pin, and a locking cam configured to rotate such that a portion of the cam is positioned over a portion of the at least one hole, and a second attachment means for releaseably coupling the shoe assembly with the HGA, the second attachment means positioned along the second end portion.

24 Claims, 8 Drawing Sheets

U.S. PATENT DOCUMENTS

| | | | |
|---|---|---|---|
| 7,061,235 B2 | 6/2006 | Guzik et al. | |
| 7,129,702 B2 | 10/2006 | Mori et al. | |
| 7,135,861 B2 | 11/2006 | Mori et al. | |
| 7,159,299 B1 | 1/2007 | McMunigal et al. | |
| 7,183,762 B2 | 2/2007 | Yamamoto | |
| 7,194,802 B2 | 3/2007 | Fayeulle et al. | |
| 7,196,512 B2 | 3/2007 | Kainuma et al. | |
| 7,207,097 B2 | 4/2007 | Detjens et al. | |
| 7,248,039 B2 | 7/2007 | Green et al. | |
| 7,288,935 B2 | 10/2007 | Farren et al. | |
| 7,429,857 B2 | 9/2008 | Guzik et al. | |
| 7,452,213 B2 | 11/2008 | Herdendorf et al. | |
| 7,471,488 B1 | 12/2008 | Zhang | |
| 7,502,204 B2 | 3/2009 | White et al. | |
| 7,542,240 B1 | 6/2009 | Bjorstrom et al. | |
| 7,889,459 B2 | 2/2011 | Lee et al. | |
| 8,094,414 B1 | 1/2012 | Cheng et al. | |
| 2003/0042895 A1 | 3/2003 | Mihara et al. | |
| 2005/0223547 A1* | 10/2005 | Pfeiffer et al. | 29/737 |
| 2006/0152856 A1 | 7/2006 | Zhao et al. | |
| 2006/0236527 A1 | 10/2006 | Davis et al. | |
| 2007/0046286 A1 | 3/2007 | Umezaki et al. | |
| 2007/0136022 A1 | 6/2007 | Anderson et al. | |
| 2007/0143053 A1 | 6/2007 | Holwell et al. | |
| 2007/0143054 A1 | 6/2007 | Anderson et al. | |
| 2007/0143055 A1 | 6/2007 | Anderson et al. | |
| 2007/0143056 A1 | 6/2007 | Anderson et al. | |
| 2007/0205763 A1 | 9/2007 | Yamasaki | |
| 2008/0060445 A1 | 3/2008 | Obergfell et al. | |
| 2008/0061776 A1 | 3/2008 | Collins et al. | |
| 2008/0062564 A1 | 3/2008 | Warn | |
| 2008/0247091 A1 | 10/2008 | Guzik et al. | |

* cited by examiner

REMOVABLE ACTUATOR ASSEMBLIES FOR TESTING HEAD GIMBAL ASSEMBLIES OF A STORAGE DEVICE

FIELD

The present invention relates to information storage devices, and more specifically to removable actuator assemblies for testing head gimbal assemblies of a storage device.

BACKGROUND

Special testing equipment is often used to test components of a storage drive such as the head gimbal assembles (HGAs) of the storage drive. For example, a spinstand is one such test assembly that mechanically positions a head of an HGA so it can fly on a spinning disk at a desired radius, skew angle and height using one or more positioning mechanisms. The spinstand can also include sensors, mechanics, electronics and software to measure various aspects of disk drive performance. However, the spinstand and other such special testing equipment are quite expensive and sometimes fail to accurately and precisely model the characteristics of the storage devices. In addition, these conventional test assemblies often fail to provide for an adequate capability to quickly attach and remove the components to be tested, which can be important when large volumes of components require testing. As such, there is a need for a test assembly for testing components of a storage device which address these shortcomings.

SUMMARY

Aspects of the invention relate to removable actuator assemblies for testing head gimbal assemblies of a storage device. In one embodiment, the invention relates to a removable test assembly for a head gimbal assembly (HGA) of a storage device, the test assembly including an actuator base including at least one guide pin, a shoe assembly including a body including a first end portion opposite to a second end portion, a first attachment means for releaseably coupling the shoe assembly with the actuator base, the first attachment means positioned along the first end portion and including at least one hole in the body configured to receive the at least one guide pin, and a locking cam configured to rotate such that a portion of the cam is positioned over a portion of the at least one hole, and a second attachment means for releaseably coupling the shoe assembly with the HGA, the second attachment means positioned along the second end portion.

In another embodiment, the invention relates to a removable test assembly for a head gimbal assembly (HGA) of a storage device, the test assembly including an actuator base, a shoe assembly including a body including a first end portion opposite to a second end portion, a first attachment means for releaseably coupling the shoe assembly with the actuator base, the first attachment means positioned along the first end portion, and a second attachment means for releaseably coupling the shoe assembly with the HGA, the second attachment means positioned along the second end portion and including a spring loaded release arm coupled to the second end portion of the body, and a latch pin attached to a first end of the release arm, the latch pin including an end configured to be moved between a retaining position and a non-retaining position in accordance with a movement of the release arm.

DETAILED DESCRIPTION

Figure 1:
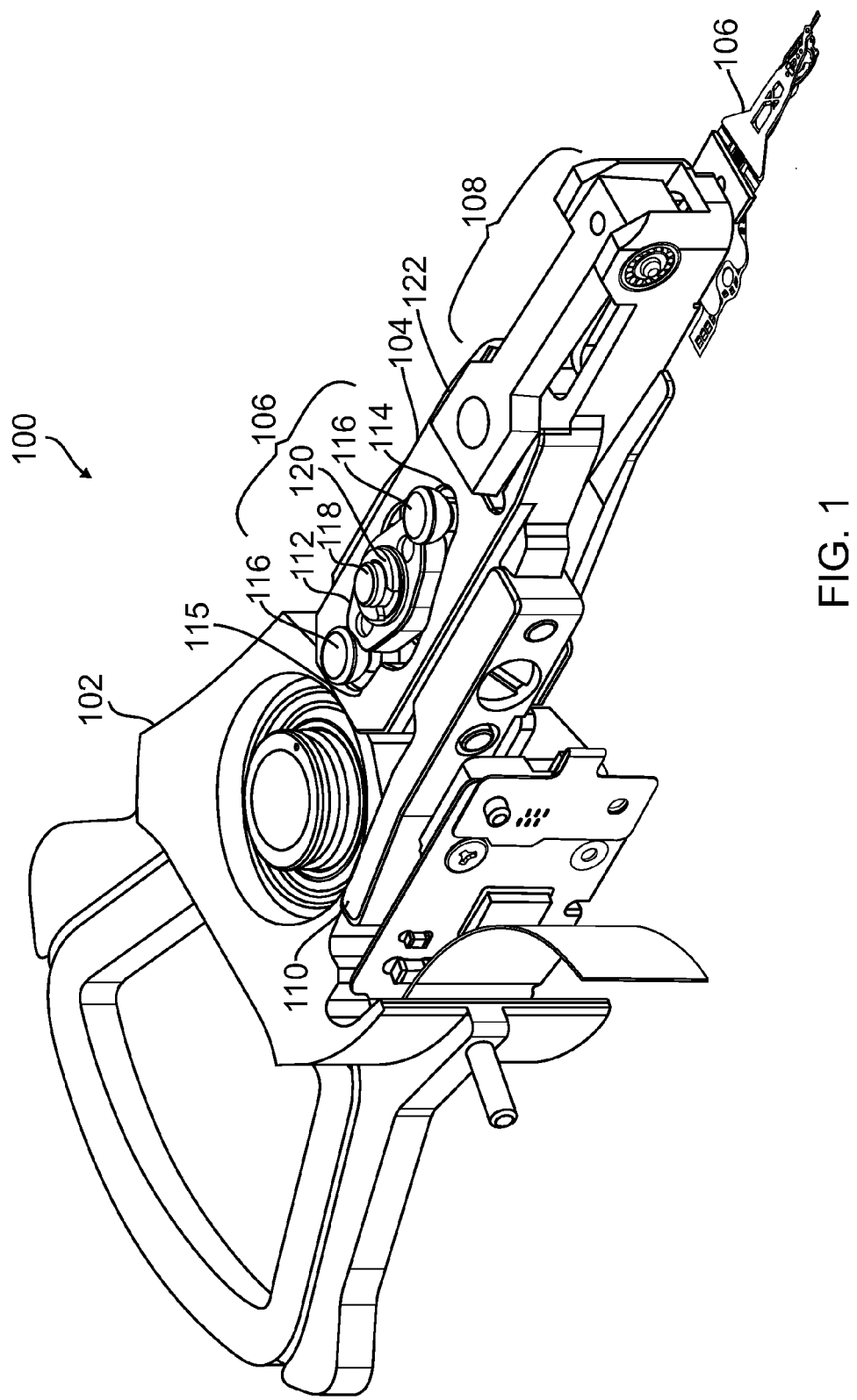
FIG. 1 is a top perspective view of a removable test assembly including an actuator base, a shoe assembly and a HGA, where the shoe assembly includes a first attachment assembly for coupling the actuator base and shoe assembly at one end, and a second attachment assembly for coupling the shoe assembly with the HGA at another end in accordance with one embodiment of the invention.

Referring now to the drawings, embodiments of removable test assemblies for use in testing head gimbal assemblies (HGAs) of a storage device are illustrated. The removable test assemblies include an actuator base, an HGA, and a shoe assembly having a body with a first attachment assembly positioned at one end of the body and a second attachment assembly positioned at an opposite end of the body. The first attachment assembly is configured to releasably couple the shoe assembly and the actuator base. The second attachment assembly is configured to releasably couple the shoe assembly and the HGA.

The first attachment assembly can include two holes in the body for receiving two guide pins of the actuator base and a locking cam configured to rotate and retain the shoe assembly by contacting a portion of the guide pins. In several embodiments, the locking cam can be rotated from a locked or retaining position to an unlocked or non-retaining position, or vice versa. The second attachment assembly can include a latch pin coupled to a spring loaded release arm where the latch pin releaseably couples the shoe assembly and the HGA. In several embodiments, the latch pin can be moved between a default retaining position and a non-retaining position when the release arm is moved. In a number of embodiments, an end of the latch pin extends into a swaging hole of the HGA. In such case, the latch pin end can make contact with a rim of the swaging hole in the retaining position and can make little or no contact with the rim in the non-retaining position.

In a number of embodiments, the removable test assemblies are used in conjunction with a drive based testing system where a number of existing components of production storage drives are used in testing HGAs (e.g., drive motor, printed circuit board assembly, preamplifier, and firmware). In such case, the drive based test configuration is more similar to the environment of a production storage drive than the test configurations provided by conventional test equipment such as a spinstand. This is due, at least in part, to the use of the production components and production type algorithms in the drive based test configuration. In addition, the drive based testing system and removable test assemblies can be significantly less expensive than the conventional test equipment.

FIG. 1 is a top perspective view of a removable test assembly 100 including an actuator base 102, a shoe assembly 104 and a HGA 106, where the shoe assembly 104 includes a first attachment assembly 106 for coupling the actuator base 102 and shoe assembly 104 at one end, and a second attachment assembly 108 for coupling the shoe assembly 104 with the HGA 106 at another end in accordance with one embodiment of the invention. The shoe assembly 104 further includes a flex holder arm 110 for retaining a flexible circuit (not shown) of the HGA 106 and securing the flexible circuit to electrical contacts/pogo pins (not visible) of the actuator base 102.

The first attachment assembly 106 includes a locking cam 112 and first and second mounting holes (114, 115) positioned at one end of the body of the shoe assembly 104. The first mounting hole 114 is cylindrical in shape and extends through the width of the body of the shoe assembly 104. The second mounting hole 115 is a slot shaped hole that also extends through the width of the body of the shoe assembly 104. In the lateral direction, slot 115 extends in a direction parallel to the length of the body of the shoe assembly 104.

The locking cam 112 is positioned between the two mounting holes (114, 115) and two guide pins 116 of the actuator base that extend into mounting holes (114, 115). The slot shaped hole 115 enables some tolerance for the spacing of the guide pins 116. In the configuration illustrated in FIG. 1, the locking cam 112 is rotated to a locked or retaining position where it is positioned over a portion of each of the mounting holes (114, 115) and makes contact with mushroom shaped ends of the guide pins 116. The mushroom shaped ends of the guide pins 116 each include a circular recess around the end of the pin configured to receive an end of the oval shaped locking cam 112. The locking cam 112 can also be rotated to an unlocked or non-retaining position where ends of the locking cam 112 are not substantially positioned over the mounting holes (114, 115) and do not contact the guide pins 116. In the unlocked position, the shoe assembly 104 can be lifted and removed from the actuator base 102. The locking cam 112 is secured to a mounting shaft or pin 118 by a retaining ring or circlip 120 that extends at least partially into a circular recess or grove positioned around the exposed end of the mounting shaft 118. The end of the mounting shaft 118 thereby forms a terminal portion having a diameter or circumference that is larger than the diameter or circumference of the adjacent circular recessed portion.

The second attachment assembly 108 includes a latch pin (not visible) coupled to a spring loaded release arm 118 for releaseably coupling the HGA 106 and the shoe assembly 104. In operation, the latch pin extends into a swaging hole (not visible) of the HGA and makes contact with a rim of the swaging hole in a retaining position. In such case, the spring loaded release arm 122 can be compressed against the body of the shoe assembly 104 thereby moving the latch pin to a non-retaining position where the latch pin makes little or no contact with the rim of the swaging hole. In the non-retaining position, the HGA 106 can be removed from the shoe assembly 104.

In the embodiment of the shoe assembly 104 illustrated in FIG. 1, the second attachment assembly 108 is positioned to attach the HGA 106 on a bottom surface of the shoe assembly 104 (e.g., down facing HGA). In other embodiments, however, the second attachment assembly 108 can be repositioned to attach the HGA 106 on a top surface of the shoe assembly 104 (e.g., up facing HGA). This capability of providing for attachment on either the top surface or bottom surface of the shoe assembly 104 provides for greater flexibility in testing the HGAs and for supporting multiple test configurations involving multiple removable test assemblies. In addition, this capability can simplify the test system structure.

Figure 2:
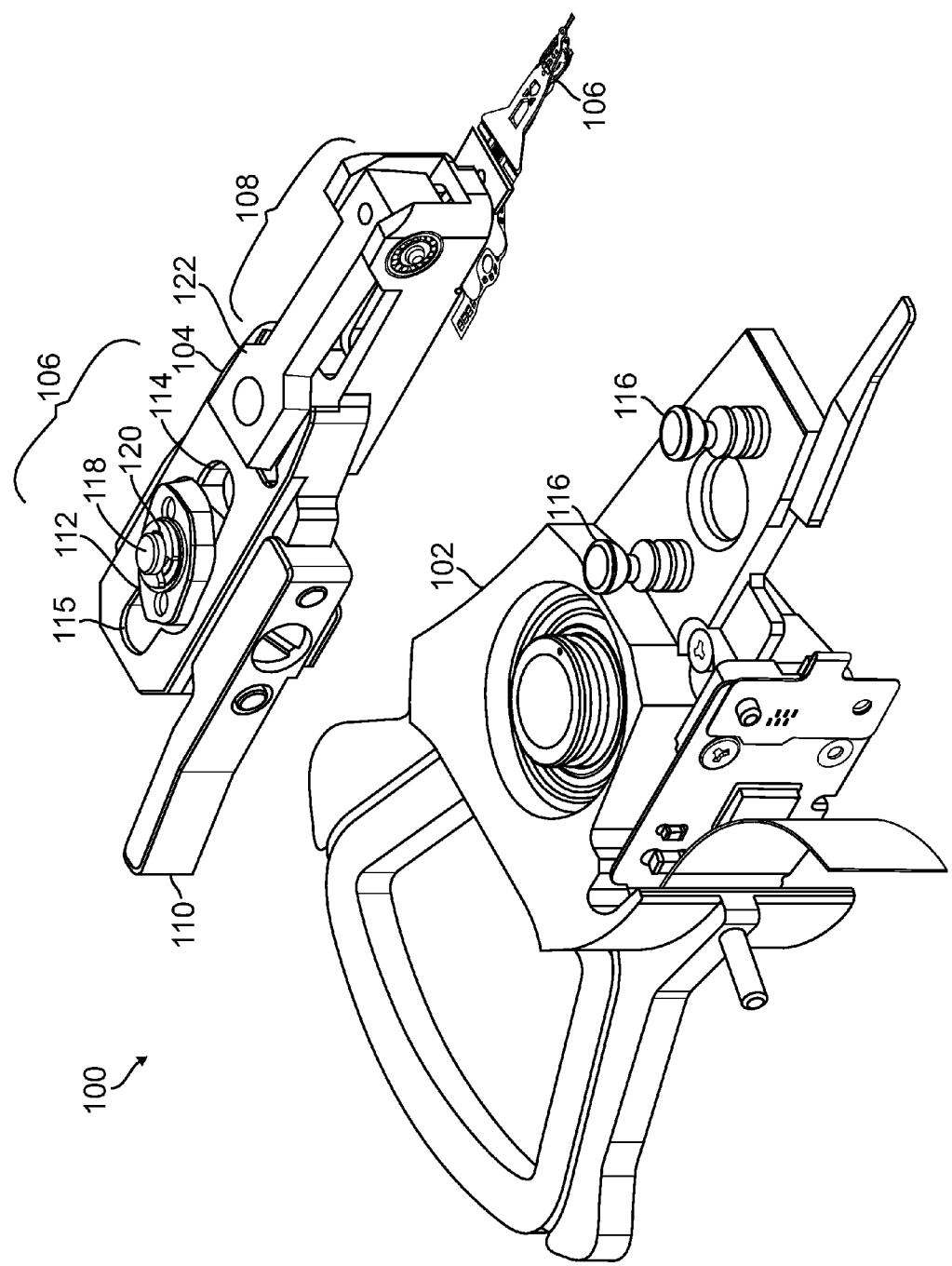
FIG. 2 is a top perspective view of the removable test assembly of FIG. 1 where the actuator base has been detached from the shoe assembly of the removable test assembly to illustrate operation of the first attachment assembly in accordance with one embodiment of the invention.

FIG. 2 is a top perspective view of the removable test assembly of FIG. 1 where the actuator base 102 has been detached from the shoe assembly 104 of the removable test assembly 100 to illustrate operation of the first attachment assembly 106 in accordance with one embodiment of the invention. In FIG. 2 as compared to FIG. 1, the locking cam 112 has been rotated to release the shoe assembly 104 from the guide pins 116 of the actuator base 102. In addition, the shoe assembly 104 has been fully detached from the actuator base 102.

Figure 3:
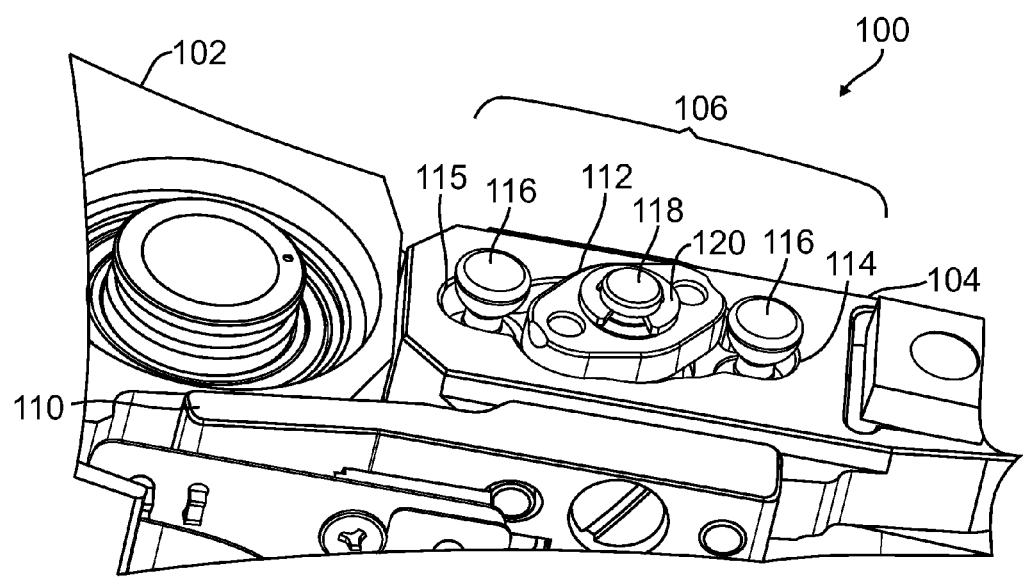
FIG. 3 is an expanded top perspective view of the first attachment assembly of the removable test assembly of FIG. 1 including a locking cam and two guide pins in an unlocked position in accordance with one embodiment of the invention.

FIG. 3 is an expanded top perspective view of the first attachment assembly 106 of the removable test assembly of FIG. 1 including the locking cam 112 and two guide pins 116 in an unlocked position in accordance with one embodiment of the invention. The locking cam 112 can be rotated by applying a force to the oval shaped body of the cam 112.

Figure 4:
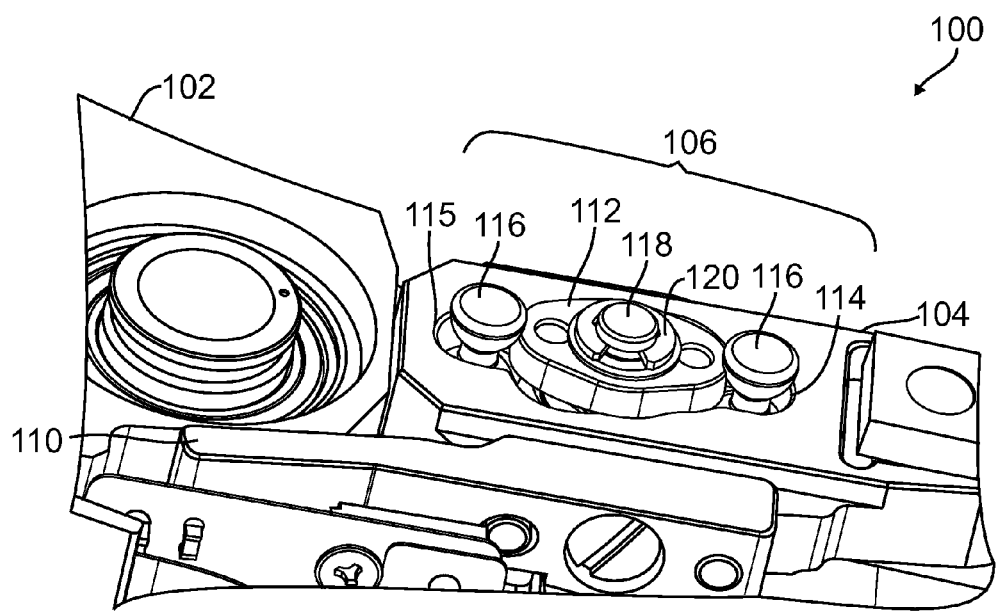
FIG. 4 is an expanded top perspective view of the first attachment assembly of FIG. 3 including the locking cam and the two guide pins in a locked position in accordance with one embodiment of the invention.

FIG. 4 is an expanded top perspective view of the first attachment assembly 106 of FIG. 3 including the locking cam 112 and the two guide pins 116 in a locked position in accordance with one embodiment of the invention. In the locked position, ends of the oval shaped locking cam 112 extend into the circular recesses of the mushroom shaped ends of the two guide pins 116.

Figure 5:
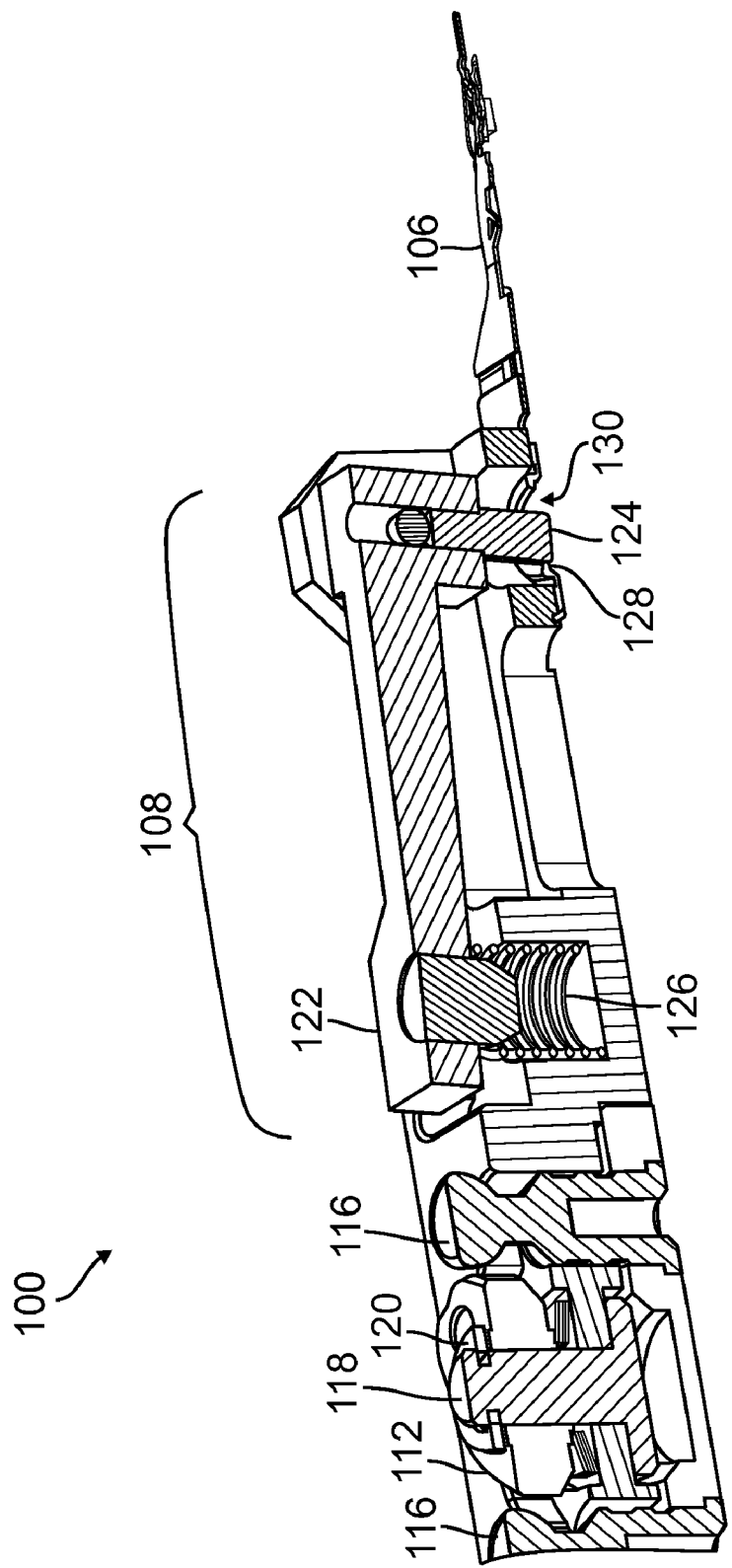
FIG. 5 is a cross sectional top perspective view of the second attachment assembly of the shoe assembly and the HGA, where the second attachment assembly includes a latch pin coupled to a spring loaded release arm for releasably coupling the HGA and the shoe assembly in accordance with one embodiment of the invention.

FIG. 5 is a cross sectional top perspective view of the second attachment assembly 108 of the shoe assembly 100 and the HGA 106, where the second attachment assembly 108 includes a latch pin 124 coupled to the spring loaded release arm 122 for releasably coupling the HGA 106 and the shoe assembly 104 in accordance with one embodiment of the invention. The second attachment assembly 108 further includes a spring 126 positioned in a spring chamber of the shoe assembly 104, where the spring is configured to apply a force on the release arm 122 away from the shoe assembly. The release arm 122 has an elongated body having a first end that receives the spring force and a second end configured to receive a pivot pin fixed to the shoe assembly 104. The second end of the release arm 122 also includes a cylindrical chamber for receiving and retaining the latch pin 124. In several embodiments, an interference fit retains the latch pin 124 within the cylindrical chamber.

In operation, in the default retaining position, the spring 126 of the second attachment assembly 108 applies a force on the release arm 122 away from the shoe assembly 104 such that the latch pin 124 makes contact with a rim 128 of a swaging hole 130 of the HGA 106. The latch pin 124 also applies a lateral retaining force on the rim 128 such that a combination of the lateral force and a retaining wall (not visible in FIG. 5 but see FIG. 6) of the shoe assembly 104 maintain attachment of the HGA 106 to the shoe assembly 104 in the retaining position.

If sufficient pressure is applied to the release arm 122 near the spring 126 in the direction of the shoe assembly 104 (e.g., a force to compress spring 126), then the release arm 122 and latch pin 124 are moved to a non-retaining position where the latch pin 124 has little or no contact with the rim 128 of the swaging hole 130 of the HGA 106. In such case, the HGA 106 is no longer retained and can be easily and quickly detached from the shoe assembly 104. The fast release and attachment capability of the second attachment assembly 108 allows for rapid interchangeability of numerous HGAs for testing. In some embodiments, an operator can attach numerous shoe assemblies to an equal number of HGAs thereby queuing up a number of assemblies for subsequent testing and attachment to the actuator base.

Figure 6:
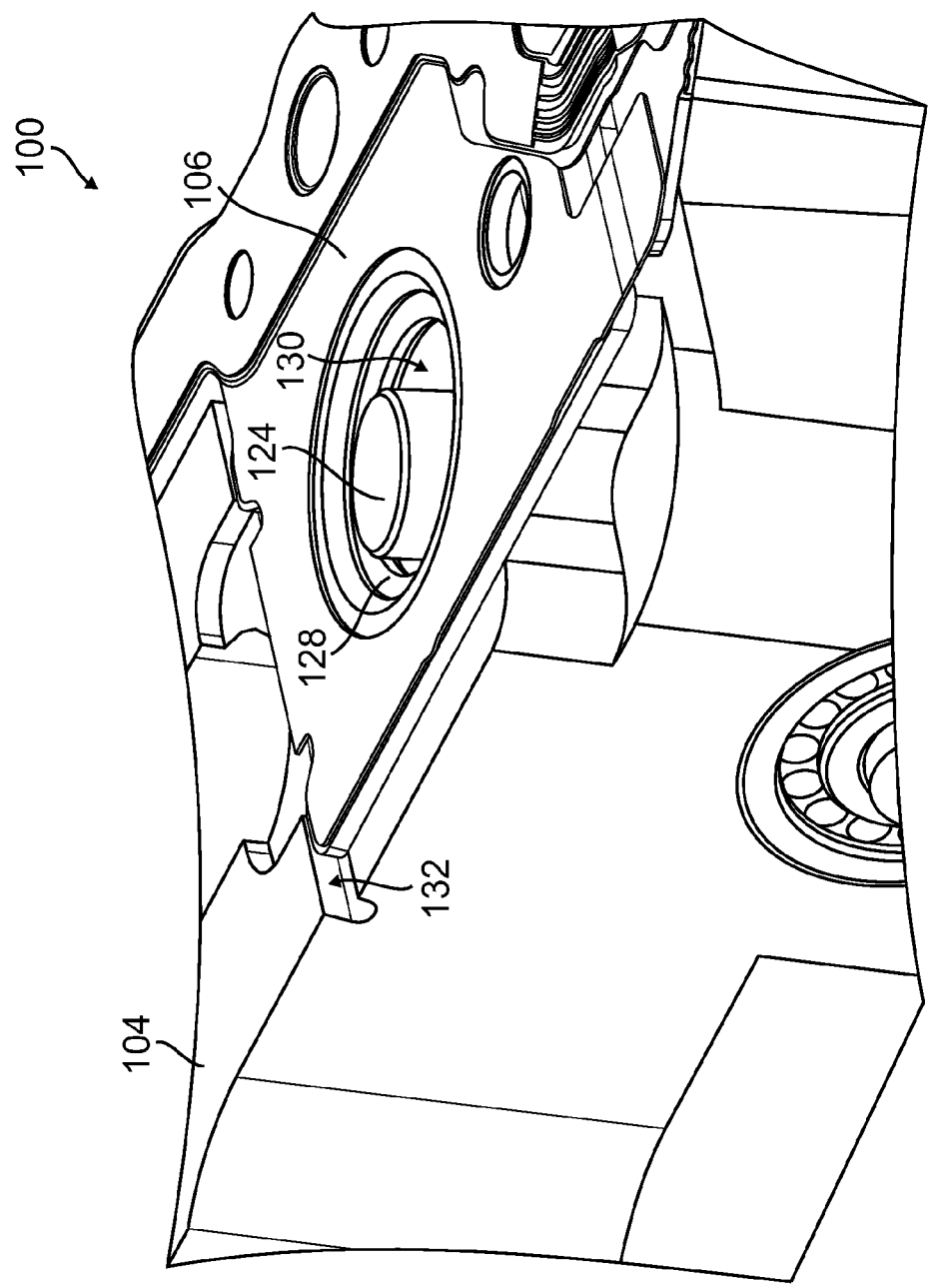
FIG. 6 is an expanded bottom perspective view of the latch pin of the shoe assembly of FIG. 5 extending into and making contact with a rim of a swaging hole of the HGA in a retaining position in accordance with one embodiment of the invention.

FIG. 6 is an expanded bottom perspective view of the latch pin 124 of the shoe assembly 104 of FIG. 5 extending into and making contact with the rim 128 of the swaging hole 130 of the HGA 106 in the retaining position in accordance with one embodiment of the invention. In the retaining position, the latch pin 124 makes contact with and imparts a lateral force to the rim 128. Retaining wall 132 of the shoe assembly 104 counters the lateral force of the latch pin 124 on the HGA 106 to maintain attachment of the HGA 106 to the shoe assembly 104.

Figure 7:
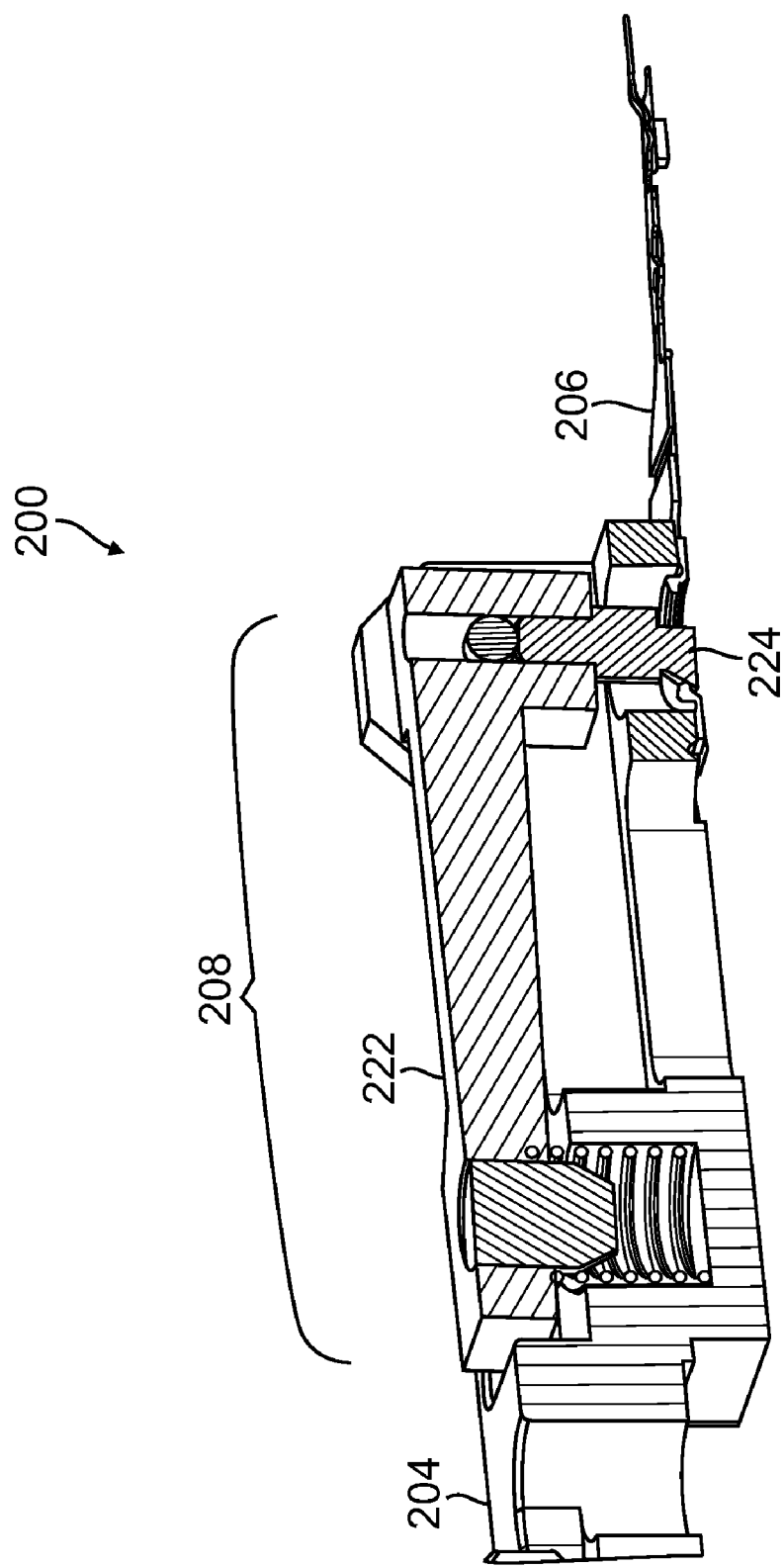
FIG. 7 is a cross sectional top perspective view of a second attachment assembly of an alternative shoe assembly and an HGA, where the second attachment assembly includes a mushroom shaped latch pin coupled to a spring loaded release arm for releasably coupling the HGA and the shoe assembly in accordance with one embodiment of the invention.

FIG. 7 is a cross sectional top perspective view of a second attachment assembly 208 of an alternative shoe assembly 204 and an HGA 206, where the second attachment assembly 208 includes a mushroom shaped latch pin 224 coupled to a spring loaded release arm 222 for releasably coupling the HGA 206 and the shoe assembly 204 in accordance with one embodiment of the invention.

Figure 8:
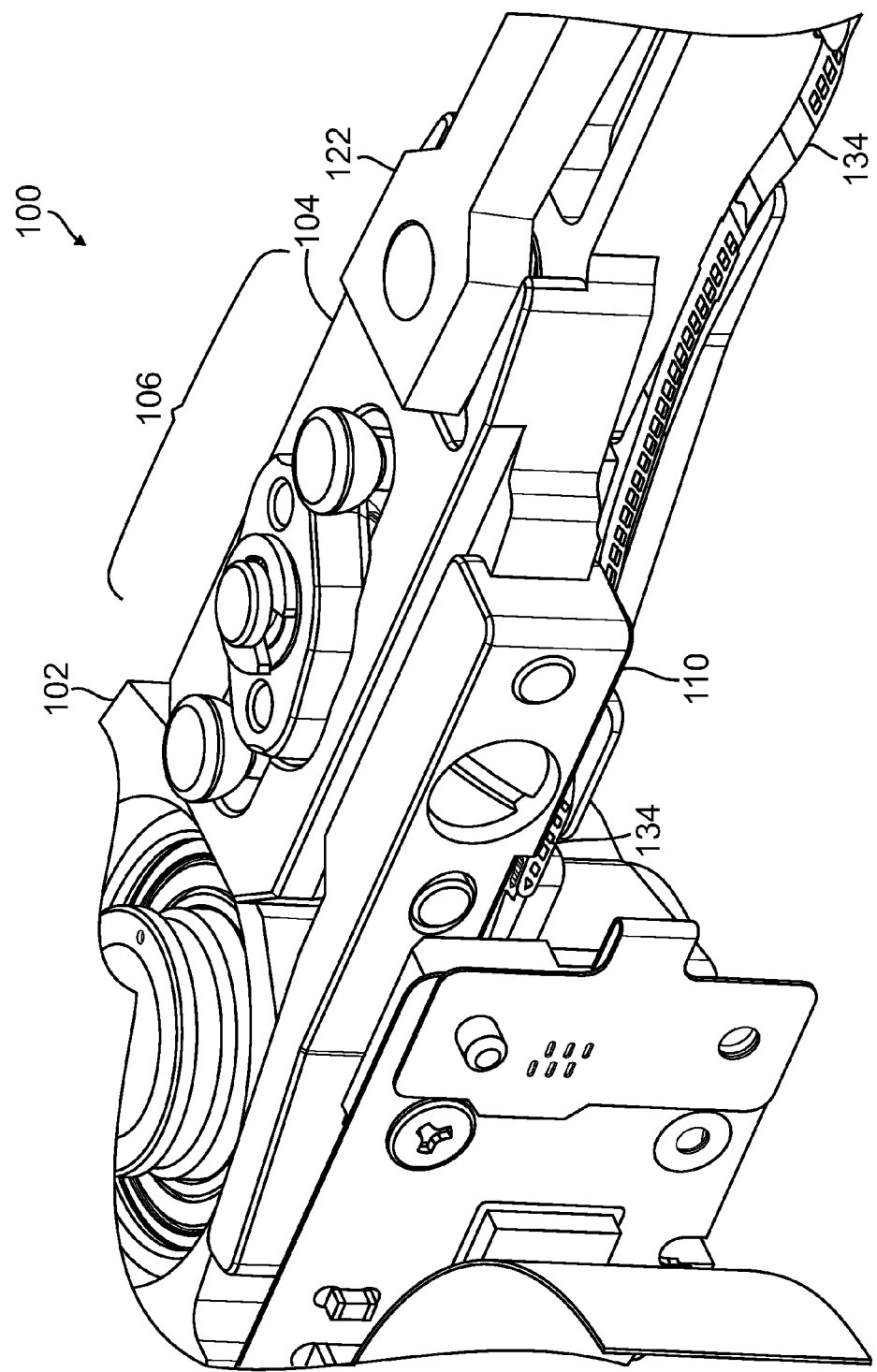
FIG. 8 is an expanded top perspective view of the shoe assembly of FIG. 1 being attached to the actuator base using the first attachment assembly and a flex holder arm of the shoe assembly, where the flex holder arm helps guide the shoe assembly and retains a narrow flex circuit of the HGA between the flex arm and the actuator base during attachment in accordance with one embodiment of the invention.

FIG. 8 is an expanded top perspective view of the shoe assembly 104 of FIG. 1 being attached to the actuator base 102 using the first attachment assembly 106 and a flex holder arm 110 of the shoe assembly 104, where the flex holder arm 106 helps guide the shoe assembly 104 and retains a narrow flex circuit 134 of the HGA (not visible) between the flex arm 110 and the actuator base 102 during attachment in accordance with one embodiment of the invention. The flex circuit 134 includes one or more circuit traces that provide electrical contact between components of the HGA and test circuitry positioned on or coupled to the actuator base 102.

Figure 9:
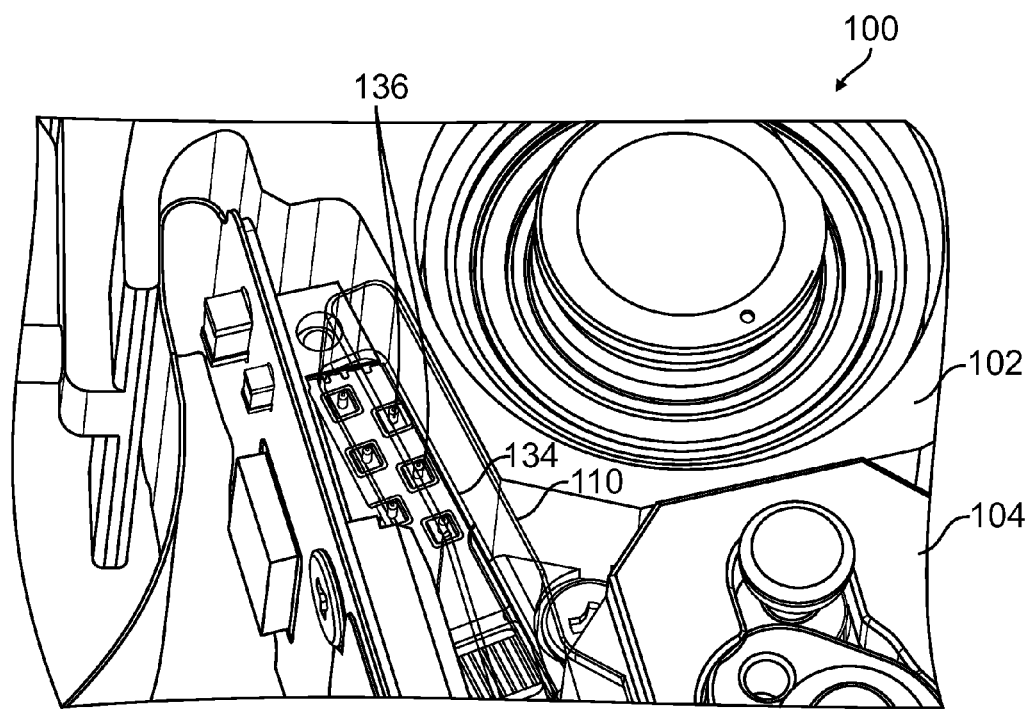
FIG. 9 is an expanded top perspective view of the flex holder arm of the shoe assembly of FIG. 1 sandwiching the flex circuit against the actuator base and onto pogo pins of the actuator base, where the flex holder arm is shown as being transparent to illustrate the arrangement of the flex arm, flex circuit, and pogo pins in accordance with one embodiment of the invention.

FIG. 9 is an expanded top perspective view of the flex holder arm 110 of the shoe assembly 104 of FIG. 1 sandwiching the flex circuit 134 against the actuator base 102 and onto pogo pins 136 of the actuator base 102, where the flex holder arm 110 is shown as being transparent to illustrate the arrangement of the flex arm 110, flex circuit 134, and pogo pins 136 in accordance with one embodiment of the invention.

Figure 10:
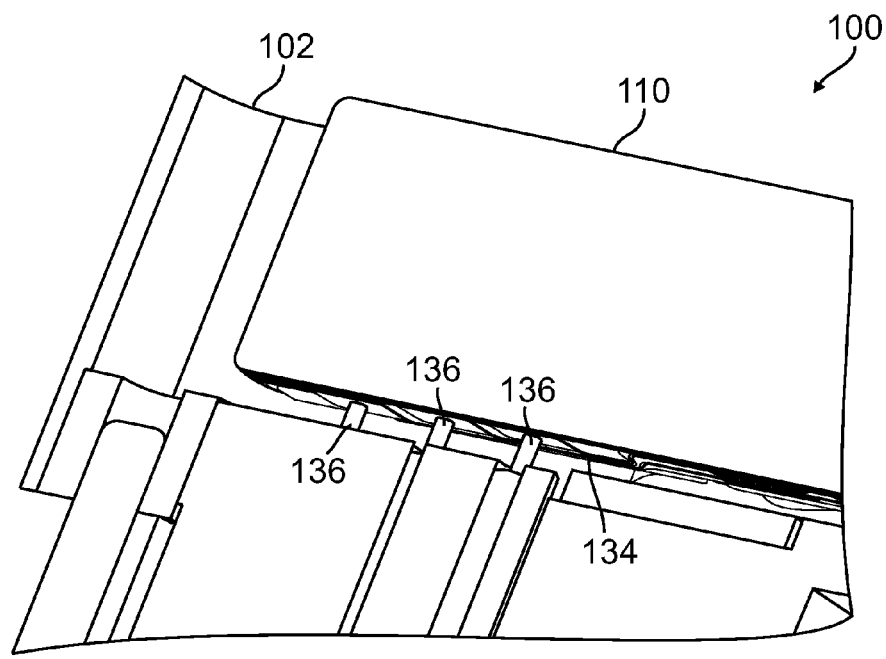
FIG. 10 is an expanded bottom cross sectional perspective view of the flex holder arm during attachment of the shoe assembly of FIG. 1 to the actuator base, where the flex arm holder is sandwiching the flex circuit against the actuator base and onto pogo pins of the actuator base in accordance with one embodiment of the invention.

FIG. 10 is an expanded bottom cross sectional perspective view of the flex holder arm 110 during attachment of the shoe assembly of FIG. 1 to the actuator base 102, where the flex arm holder 110 is sandwiching the flex circuit 134 against the actuator base 102 and onto pogo pins 136 of the actuator base 102 in accordance with one embodiment of the invention.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A removable test assembly for a head gimbal assembly (HGA) of a storage device, the test assembly comprising:
   an actuator base comprising at least one guide pin;
   a shoe assembly comprising:
      a body comprising a first end portion opposite to a second end portion;
      a first attachment means for releaseably coupling the shoe assembly with the actuator base, the first attachment means positioned along the first end portion and comprising:
         at least one hole in the body configured to receive the at least one guide pin; and
         a locking cam configured to rotate such that a portion of the cam is positioned over a portion of the at least one hole; and
      a second attachment means for releaseably coupling the shoe assembly with the HGA, the second attachment means positioned along the second end portion.

2. The test assembly of claim 1:
   wherein the at least one guide pin comprises a first guide pin and a second guide pin;
   wherein the at least one hole comprises a first hole configured to receive an end of the first guide pin and a second hole configured to receive an end of the second guide pin;
   wherein the locking cam is configured to rotate such that a portion of the cam is positioned over a portion of the first hole and the second hole.

3. The test assembly of claim 2, wherein the second hole comprises a slot shape.

4. The test assembly of claim 2, wherein the locking cam comprises an oval shape having a central hole for receiving a pin for retaining the locking cam to the shoe assembly.

5. The test assembly of claim 2:
   wherein the end of the first guide pin and the end of the second guide pin comprise a mushroom shape.

6. The test assembly of claim 5,
   wherein the mushroom shape comprises a terminal portion having a first diameter, and an inner portion adjacent to the terminal portion, the inner portion having a second diameter less than the first diameter.

7. The test assembly of claim 1:
   wherein the body comprises a retaining wall configured to abut a portion of the HGA;
   wherein the second attachment means comprises a latch pin comprising an end configured to be moved between a retaining position and a non-retaining position, and to extend into a swaging hole of the HGA.

8. The test assembly of claim 7:
   wherein, in the retaining position, the end of the latch pin contacts a rim of the swaging hole and thereby applies a lateral force to the rim in a direction of the retaining wall;

wherein, in the non-retaining position, the end of the latch pin is substantially free of the rim of the swaging hole.

9. The test assembly of claim 8, wherein the end of the latch pin comprises a mushroom shape defined by a terminal portion having a first circumference, and an inner portion adjacent to the terminal portion, the inner portion having a second circumference less than the first circumference.

10. The test assembly of claim 8, wherein the second attachment means further comprises a spring loaded release arm coupled to the second end portion of the body and the latch pin, wherein the release arm is configured to pivot about a shaft fixed to the second end portion.

11. The test assembly of claim 10:
wherein the second attachment means further comprises a spring positioned between the body and the release arm, the spring configured to apply a force on the release arm directed away from the body;
wherein, in a default position, an end of the release arm extends beyond an outer surface of the body, wherein the default position corresponds to the retaining position of the latch pin;
wherein, in an actuated position, the end of the release arm is closer to the outer surface of the body than in the default position, wherein the actuated position corresponds to the non-retaining position of the latch pin.

12. The test assembly of claim 1, further comprising a flex holder arm attached along the first end portion of the body and extending away from the body, the flex holder arm configured to receive and retain a flexible circuit of the HGA.

13. The test assembly of claim 12, wherein the flex holder arm comprises at least one hole configured to receive a pogo pin configured to make conductive contact with the flexible circuit.

14. A removable test assembly for a head gimbal assembly (HGA) of a storage device, the test assembly comprising:
an actuator base;
a shoe assembly comprising:
    a body comprising a first end portion opposite to a second end portion;
    a first attachment means for releaseably coupling the shoe assembly with the actuator base, the first attachment means positioned along the first end portion; and
    a second attachment means for releaseably coupling the shoe assembly with the HGA, the second attachment means positioned along the second end portion and comprising:
        a spring loaded release arm coupled to the second end portion of the body; and
        a latch pin attached to a first end of the release arm, the latch pin comprising an end configured to be moved between a retaining position and a non-retaining position in accordance with a movement of the release arm.

15. The test assembly of claim 14:
wherein the body comprises a retaining wall configured to abut a portion of the HGA;
wherein, in the retaining position, the end of the latch pin contacts a rim of a swaging hole of the HGA and thereby applies a lateral force to the rim in a direction of the retaining wall;
wherein, in the non-retaining position, the end of the latch pin is substantially free of the rim of the swaging hole.

16. The test assembly of claim 15, wherein the end of the latch pin comprises a mushroom shape defined by a terminal portion having a first circumference, and an inner portion adjacent to the terminal portion, the inner portion having a second circumference less than the first circumference.

17. The test assembly of claim 15, wherein the release arm is configured to pivot about a shaft fixed to the second end portion.

18. The test assembly of claim 17:
wherein the second attachment means further comprises a spring positioned between the body and the release arm, the spring configured to apply a force on the release arm directed away from the body;
wherein, in a default position, a second end of the release arm, opposite to the first end, extends beyond an outer surface of the body, wherein the default position corresponds to the retaining position of the latch pin;
wherein, in an actuated position, the second end of the release arm is closer to the outer surface of the body than in the default position, wherein the actuated position corresponds to the non-retaining position of the latch pin.

19. The test assembly of claim 14, further comprising a flex holder arm attached along the first end portion of the body and extending away from the body, the flex holder arm configured to receive and retain a flexible circuit of the HGA.

20. The test assembly of claim 19:
wherein the actuator base comprises at least one pogo pin configured to make conductive contact with the flexible circuit;
wherein the flex holder arm comprises at least one hole configured to receive the at least one pogo pin.

21. The test assembly of claim 20:
wherein the flex holder arm and actuator base are configured to sandwich the flexible circuit of the HGA when the first attachment means secures the shoe assembly with the actuator base.

22. The test assembly of claim 14:
wherein the actuator base comprises at least one guide pin;
wherein first attachment means comprises:
    at least one hole in the body configured to receive the at least one guide pin; and
    a locking cam configured to rotate such that at least a portion of the cam is positioned over a portion of the at least one hole.

23. The test assembly of claim 22:
wherein the at least one guide pin comprises a first guide pin and a second guide pin;
wherein the at least one hole comprises a first hole configured to receive an end of the first guide pin and a second hole configured to receive an end of the second guide pin; and
wherein the locking cam is configured to rotate such that a portion of the cam is positioned over a portion of the first hole and the second hole.

24. The test assembly of claim 23, wherein the second hole comprises a slot shape.

* * * * *